Patented Aug. 13, 1935

2,011,337

UNITED STATES PATENT OFFICE 2,011,337

PROCESS FOR PURIFYING THE HORMONE OF THE CORPUS LUTEUM

Max Hartmann, Riehen, near Basel, and Albert Wettstein, Basel, Switzerland, assignors to Society of Chemical Industry in Basle, Basel, Switzerland No Drawing. Application April 10, 1933, Serial No. 665,444. In Switzerland April 27, 1932

7 Claims. (Cl. 167—74)

This invention relates to a new process for purifying the hormone of the corpus luteum.

Modern investigation has shown that there is contained in the corpus luteum a sexual hormone which, among other functions, converts the mucous membrane of the uterus of a rabbit which has been changed by the oestrogenic hormones into the form characteristic for the pregnant uterus. The known processes for separating the corpus luteum hormone depend chiefly on the treatment of extracts of the yellow body with various organic solvents, or on the use of reactions which yield precipitates.

The present invention for purifying and concentrating the hormone of corpus luteum consists in a process comprising the treatment of a solution of the hormone, particularly a crude or partially purified extract of the corpus luteum, in a solvent or mixture of solvents immiscible with water, with one or more adsorption agents and then extracting the hormone from this agent, if desired after separation of further impurities, with an organic solvent or mixture of solvents.

It is possible in this manner, while separating much inactive impurities, to extract the hormone quantitatively from the parent solution and to recover it from the adsorbent.

As solvent for the hormone or the extract containing the hormone there may be used, for example, benzene, toluene, petroleum ether, carbon bisulfide or a mixture of any of these. Useful adsorbents are fuller's earth, alumina, fibrous alumina, kieselguhr, silica gel, kaolin, calcium carbonate, carbon or the like.

It is preferable to conduct the adsorption in complete absence of moisture by using quite dry solvents and adsorbents.

For extracting the corpus luteum from the adsorbent the solvent selected will depend on the kind of adsorbent. Suitable solvents are ether, alcohol, acetone, chloroform or even a mixture, such as one of methyl alcohol and petroleum ether.

The process can be carried out by mixing the solution containing the hormone with an excess of the adsorbent. Alternatively, the adsorbent may be added in separate doses, each portion being further treated separately when it has adsorbed the hormone. In this manner impurities which differ in their capacity for being adsorbed may be separated. The same object may be attained by causing the solution to flow slowly through a column of the adsorbent as is done, for example, in the adsorption analysis of Wislicenus or the chromatographic method of Tswett and then separately extracting the several layers of the adsorbent.

From the adsorbent containing the hormone further impurities can frequently be separated by taking advantage of the difference between the impurities and the hormone in respect of their solubility in solvents; thus the adsorbent may first be treated with solvents or mixtures of solvents which do not serve to extract the hormone and subsequently with the solvent appropriate for the extraction of the hormone.

The fractionating treatment may be applied advantageously immediately, or after further stages of purification.

The following examples illustrate the invention:—

Example 1

15 grams of an extract of corpus luteum obtained as described by G. W. Corner and W. M. Allen (American Journal of Physiology, Vol. 88 (1929), page 326) are dissolved in 300 cc. of carbon bisulfide. The solution is mixed with 50 grams of fuller's earth and the mixture is thoroughly shaken. After filtering, the fuller's earth is washed with 150 cc. of carbon bisulphide in all and the combined filtrate and washings are treated a second time with fuller's earth in like manner. The final filtrate yields on evaporation a thin oil which contains the main portion of the original extract but is completely inactive. The combined adsorbents are now extracted two to three times with 300 cc. on each occasion of a mixture of methyl alcohol and petroleum ether (9:1) by thorough shaking and a short boiling. Filtration and washing with the solvent follow. Evaporation of the extract leaves a small quantity of a substance resembling stearin; this contains the whole of the hormone of the corpus luteum in the parent material.

Example 2

15 grams of an extract of corpus luteum, obtained as described by G. W. Corner and W. M. Allen (American Journal of Physiology, Vol. 88 (1929), page 326) and purified further as described by W. M. Allen (American Journal of Physiology, Vol. 92 (1930), page 174), or by freezing out the ballast substances from an aqueous methyl alcohol solution are dissolved in 450 cc. of dry petroleum ether. The solution is slowly sucked through a column of fuller's earth moistened with petroleum ether. The adsorbent is then washed with the same quantity of the solvent. The evaporated filtrate leaves a large quantity of a clear but inactive oil. The adsorbent is extracted, layer by layer, for a short time with hot ethyl alcohol, the different extracts are filtered, washed and the several residues are extracted again in like manner, whereafter the solvent is evaporated from the different filtrates. The preparation thus obtained from the upper layers contains the total hormone of the corpus luteum in the extract used in the form of a substance resembling stearin.

*Example 3*

10 grams of an extract of the yellow body prepared as described by Corner and Allen loc. cit. are dissolved in 150 cc. of carbon bisulfide and the solution is thoroughly shaken with 10 grams of dry active charcoal. The adsorbent is filtered, washed with 75 cc. of carbon bisulfide and the filtrate and washings are treated in the same manner with another 10 grams of charcoal and finally with 3 grams. The feebly colored solution thus obtained yields on evaporation an oil containing the main portion of the parent material but completely inactive. The united charcoal adsorbents are now extracted twice (with 150 cc. on each occasion) with a mixture of ethyl alcohol and petroleum ether (9:1) while shaking thoroughly and boiling for a short time. The whole is filtered and the solid matter washed with 75 cc. of the warm mixture of solvents. After evaporating the united extracts there remains a small quantity of a substance resembling stearin, which contains all the hormone of the yellow body represented by the original extract.

*Example 4*

1 kilo of corpus luteum is extracted with petroleum ether. The solution thus obtained after being dried, if necessary, is shaken thoroughly with 100 grams of fuller's earth and then filtered. The fuller's earth is washed with petroleum ether and the total filtrates are again treated in like manner with fuller's earth. The solution thus obtained yields on evaporation a large quantity of an oil which is completely inactive. The united adsorbents are treated in a Soxhlet apparatus twice with methyl alcohol. The extracts are evaporated whereby there is obtained a small quantity of a substance resembling stearin. This contains the whole of the hormone of corpus luteum which was in the first extract.

*Example 5*

5 grams of a preparation of the yellow body preliminarily purified as referred to in Example 1, 2 or 4 are dissolved in 75 cc. of ethyl acetate and the solution is thoroughly shaken with 5 grams of active charcoal. After filtration and washing with the solvent, the filtrate is treated again in like manner, and a third time, but then only with 2 grams of charcoal. The filtrates contain merely inactive constituents of the parent material.

The united charcoal adsorbents are now extracted for 3 hours with absolute alcohol in a Soxhlet apparatus; the solution thus obtained yields on evaporation a dark mass resembling stearin and also inactive. By several treatments for 3 hours in a Soxhlet apparatus with a mixture of 3 volumes of chloroform, 4 volumes of methanol and 1 volume of petroleum ether the charcoal adsorbents yield, however, on evaporation of the extract, a small quantity of light colored oil, which on standing in the cold solidifies and proves to be very strongly active.

What we claim is:—

1. A process for purifying and concentrating the hormone of the corpus luteum which converts the mucous membrane of the uterus into the form characteristic for the pregnant uterus, consisting in subjecting extracts of this hormone, dissolved in organic solvents immiscible with water, to a treatment with adsorbing agents, washing the adsorbents containing the hormone with the same solvents to remove impurities and then separating the adsorbents by means of organic solvents which are capable of extracting the hormone from the adsorbents.

2. A process for purifying and concentrating the hormone of the corpus luteum which converts the mucous membrane of the uterus into the form characteristic for the pregnant uterus, consisting in subjecting extracts of this hormone, dissolved in organic solvents immiscible with water, to a fractionating treatment with adsorbing agents, washing the adsorbents containing the hormone with the same solvents to remove impurities and then separating the adsorbents by means of organic solvents which are capable of extracting the hormone from the adsorbents.

3. A process for purifying and concentrating the hormone of the corpus luteum which converts the mucous membrane of the uterus into the form characteristic for the pregnant uterus, consisting in subjecting extracts of this hormone, dissolved in organic solvents immiscible with water, to a treatment with adsorbing agents, washing the adsorbents containing the hormone with the same solvents to remove impurities and then fractionally separating the adsorbents first with such organic solvents which are capable of extracting the hormone from the adsorbents.

4. A process for purifying and concentrating the hormone of the corpus luteum which converts the mucous membrane of the uterus into the form characteristic for the pregnant uterus, consisting in subjecting extracts of this hormone, dissolved in organic solvents immiscible with water, to a fractionating treatment with adsorbing agents, washing the adsorbents containing the hormone with the same solvents to remove impurities and then fractionally separating the adsorbents first with such organic solvents which are capable of extracting the hormone from the adsorbents.

5. A process for purifying and concentrating the hormone of the corpus luteum which converts the mucous membrane of the uterus into the form characteristic for the pregnant uterus, consisting in subjecting extracts of this hormone, dissolved in petroleum ether, to a treatment with fuller's earth, washing the adsorbent containing the hormone with petroleum ether to remove impurities and then extracting the adsorbent by means of a low aliphatic alcohol.

6. A process for purifying and concentrating the hormone of the corpus luteum which converts the mucous membrane of the uterus into the form characteristic for the pregnant uterus, consisting in subjecting extracts of this hormone, dissolved in carbon bisulfide, to a treatment with charcoal, washing the adsorbent containing the hormone with carbon bisulfide to remove impurities and then extracting the adsorbent by means of a mixture of a low aliphatic alcohol and petroleum ether.

7. A process for purifying and concentrating the hormone of the corpus luteum which converts the mucous membrane of the uterus into the form characteristic for the pregnant uterus, consisting in subjecting extracts of this hormone, dissolved in ethyl acetate, to a treatment with charcoal, washing the adsorbent containing the hormone with ethyl acetate to remove impurities and then fractionally extracting the adsorbent, first to remove the remaining impurities by means of a low aliphatic alcohol, and afterwards to separate the hormone by means of a mixture of chloroform, methanol and petroleum ether.

MAX HARTMANN.
ALBERT WETTSTEIN.